(12) United States Patent
Baker

(10) Patent No.: US 10,744,818 B1
(45) Date of Patent: Aug. 18, 2020

(54) AUXILIARY TRACTION APPARATUS

(71) Applicant: Timothy Don Baker, Searcy, AR (US)

(72) Inventor: Timothy Don Baker, Searcy, AR (US)

( * ) Notice: Subject to any disclaimer, the term of this patent is extended or adjusted under 35 U.S.C. 154(b) by 0 days.

(21) Appl. No.: 16/692,358

(22) Filed: Nov. 22, 2019

(51) Int. Cl.
    *B60B 15/26*     (2006.01)
    *B60B 15/22*     (2006.01)
    *A01D 101/00*     (2006.01)

(52) U.S. Cl.
    CPC .............. *B60B 15/26* (2013.01); *B60B 15/22* (2013.01); *B60B 15/263* (2013.01); *B60B 15/266* (2013.01); *A01D 2101/00* (2013.01)

(58) Field of Classification Search
    CPC ..... B60C 27/04; B60C 27/045; B60B 15/266; B60B 15/26; B60B 15/22; B60B 15/263
    See application file for complete search history.

(56) References Cited

U.S. PATENT DOCUMENTS

| | | | | |
|---|---|---|---|---|
| 2,870,814 A * | 1/1959 | Khachikian | ............. | B60C 27/04 152/218 |
| 3,071,173 A * | 1/1963 | Hoffmann | ............. | B60C 27/045 152/216 |
| 3,190,335 A * | 6/1965 | Isaacman | ................ | B60C 27/04 152/216 |
| 3,707,308 A * | 12/1972 | Smith | ................... | B60B 15/263 301/44.1 |
| 4,129,161 A * | 12/1978 | Quintana | ................ | B60C 27/04 152/225 R |
| 4,576,214 A * | 3/1986 | Preusker | ............... | B60C 27/045 152/213 A |
| 5,156,695 A * | 10/1992 | Martin | .................... | B60C 27/04 152/216 |
| 6,983,778 B1 * | 1/2006 | Pitts | ........................ | B60B 15/22 152/216 |
| 2007/0113943 A1 * | 5/2007 | Chaisson, Jr. | .......... | B60C 27/04 152/226 |
| 2011/0303334 A1 * | 12/2011 | Safranek | ................. | B60C 27/04 152/216 |

* cited by examiner

*Primary Examiner* — Scott A Browne
(74) *Attorney, Agent, or Firm* — Joe D. Calhoun

(57) ABSTRACT

An apparatus providing auxiliary traction to a riding lawnmower or similarly light off-road vehicle having a drive wheel with a hub anchored to a drive axle. The apparatus generally includes at least one traction bar having a pair of traction ends equally spaced beyond the outer circumference of the wheel. The traction bar anchored to a carrier mounted to the hub of the drive wheel. A traction bar of variable length may be achieved by having two traction arms, one telescopically received within the other, with a length-locking means such as retainer pins inserted through aligned bores extending through the overlapping traction arms and the carrier mounted to the hub.

11 Claims, 21 Drawing Sheets

US 10,744,818 B1

AUXILIARY TRACTION APPARATUS

(B) FEDERALLY SPONSORED RESEARCH AND DEVELOPMENT

Not applicable.

(C) MICROFICHE APPENDIX

Not applicable.

(D) BACKGROUND OF THE INVENTION

(1) Field of the Invention

The present invention generally relates to devices for providing additional traction to wheels of off road vehicles, especially relatively light off road vehicles. More particularly, the apparatus disclosed herein relates to devices preventing or making it less likely that the vehicle will become stuck in mud or other soft terrain. A representative sample of such vehicles includes riding lawn mowers (especially "zero turn" mowers), all terrain vehicles (ATVs), utility task vehicles (UTVs), and other light vehicles often driven off of pavement.

(2) Background of the Invention

Auxiliary traction devices known in the field include such things as studded tire treads, and tire tread patterns designed to provide traction to the wheels even while traveling through mud or other soft terrain. Also known in the field are track elements encircling multiple wheels forming a so-called continuous track (also called tank treads or caterpillar tracks), typically having a series of periodic ridges perpendicular to the wheels which are designed to propel the vehicle through muddy terrain. However, most such devices are not necessary most of the time the vehicles are in ordinary use. Moreover, most of those devices make the ride bumpy for the riders, and/or reduce the fuel efficiency of the vehicles, and/or damage the roadways.

One objective of the present invention is to provide an apparatus that can be easily deployed when needed, but which will not detract from the vehicle's use or from the rider's comfort while not in use.

Another object of the present invention is to provide an apparatus that is effective in preventing the vehicle from becoming stuck in muddy or otherwise soft terrain.

Another object of the present invention is to provide an apparatus that may function as an earth-turning implement when needed.

Other objects and utilities of the invention disclosed herein will be apparent after a review and consideration of the disclosure and claims of this application, which is not necessarily limited to the embodiments disclosed herein.

(F) SUMMARY OF THE INVENTION

One general embodiment of the invention disclosed herein comprises (includes) an apparatus providing auxiliary traction to a drive wheel with a hub anchored to a drive axle. The apparatus may include at least one traction bar anchored to a mounting means for mounting the traction bar to the hub of the drive wheel. In general, the invention provides additional traction to prevent an off-road vehicle from becoming stuck in mud or soft terrain.

The prototype comprises a pair of frames, each for attachment to the hub of the drive wheel of a riding lawnmower or similar light off-road vehicle. Each frame includes a steel ring mounted to the drive wheel hub, and has a plurality of separator struts between that hub ring and a larger concentric ring spaced outwardly from the hub ring; that outer ring has a pair of brackets accepting insertion of a pair of traction arms, one arm telescopically received within the other and joined together to form a traction bar having traction feet at both ends extending beyond the circumference of the vehicle tires.

The insertion of one traction arm's inner end (having a series of holes completely through) into the other traction arm's sleeve end (having a like series of holes) allows for different lengths of extension. For example, when the traction arm insertion end is inserted within the transaction arm sleeve end so that the holes farthest from the free ends align, and with fastener pins extending completely through the overlapping arms (and outer ring and the respective retainer brackets), the traction feet will not extend beyond the circumference of the wheels so that the vehicle can be driven with the apparatus "ready" but without actually being in use. When the traction arm insertion end is inserted only partially within the transaction arm sleeve end so that only the middle holes of both arms align, and fastener pins affixed, the traction feet will extend a short distance beyond the circumference of the wheels so that the traction feet contact the ground as the vehicle is driven. And when the traction arm insertion end is inserted the least within the transaction arm sleeve end (so that only the holes nearest the free ends of both arms align), the traction feet will be extended the most beyond the circumference of the wheels, to provide the vehicle with the maximum auxiliary traction.

(G) BRIEF DESCRIPTION OF THE DRAWINGS

The novel features believed characteristic of the disclosed subject matter will be set forth in the claims. The disclosed subject matter itself, however, as well as a preferred mode of use, further objectives, and advantages thereof, will best be understood by reference to the following detailed description of an illustrative embodiment when read in conjunction with the accompanying drawings.

(H) DETAILED DESCRIPTION OF THE INVENTION

Figure 1:
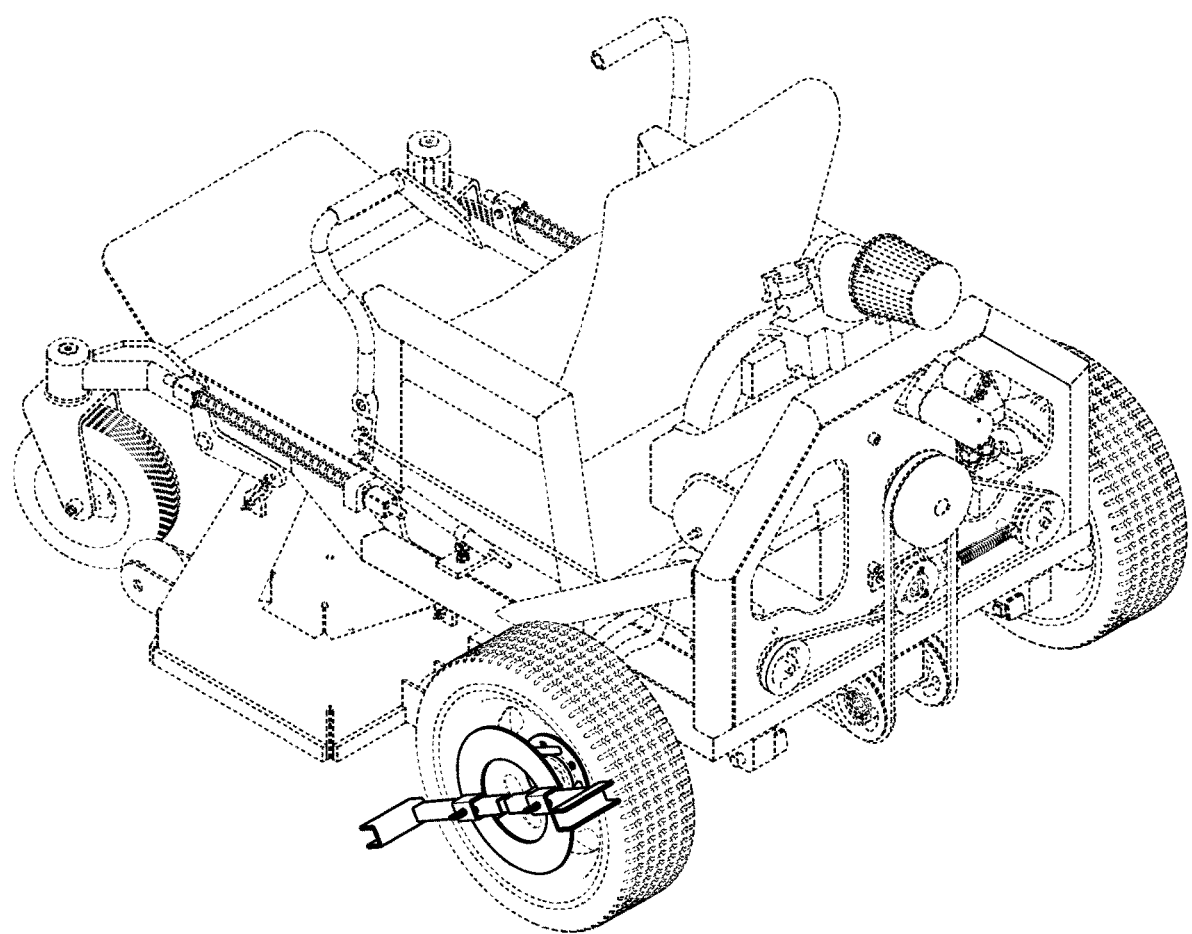
FIG. 1 is a perspective view of a representative sample of the auxiliary traction apparatus mounted on the hub of a vehicle (unclaimed), in a traction configuration.
Figure 2:
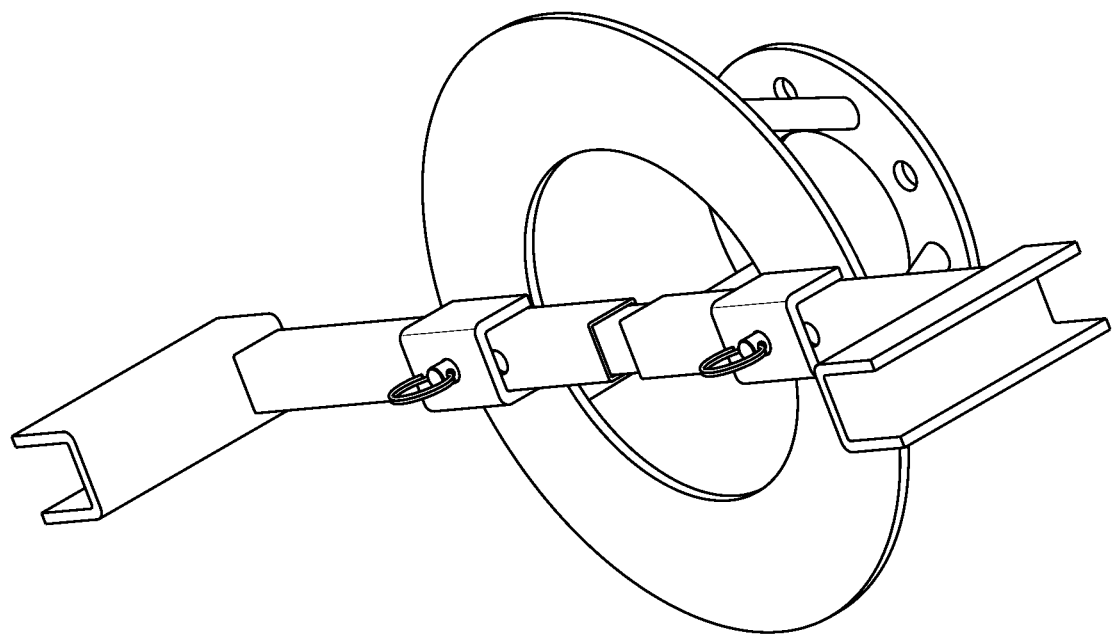
FIG. 2 is a perspective view of the apparatus of FIG. 1, with the vehicle removed and the traction bars in a horizontal orientation.
Figure 3:
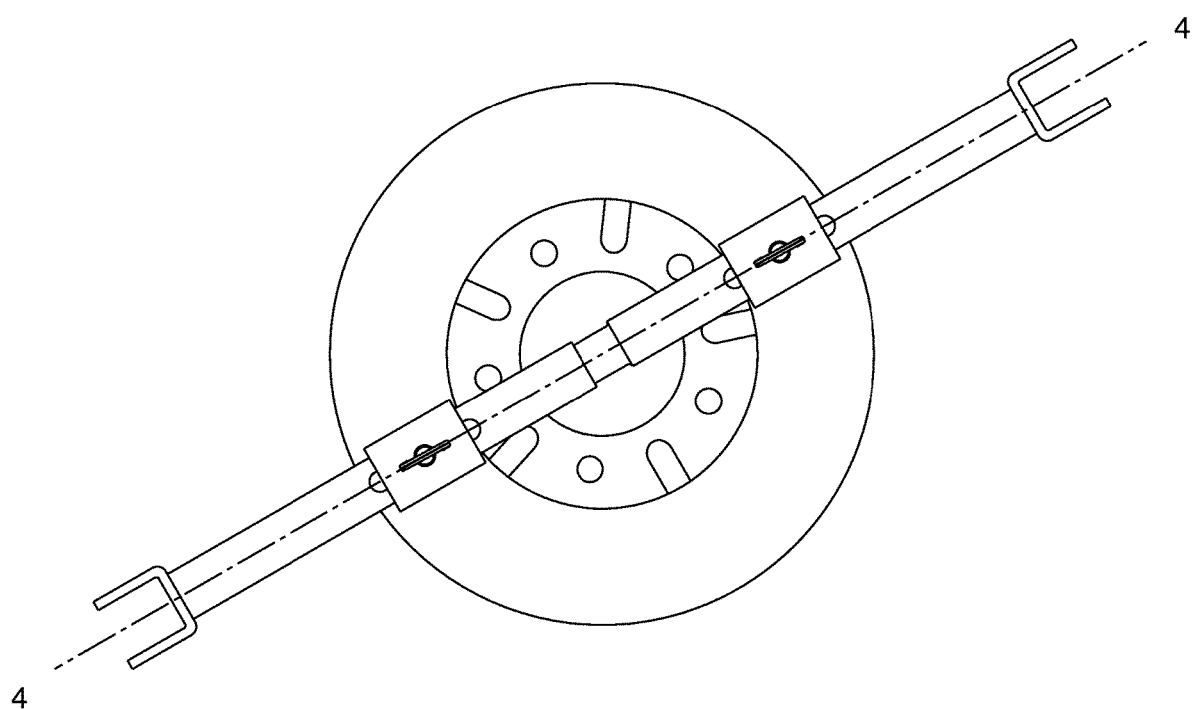
FIG. 3 is a side elevation view of the apparatus of FIG. 2.
Figure 4:
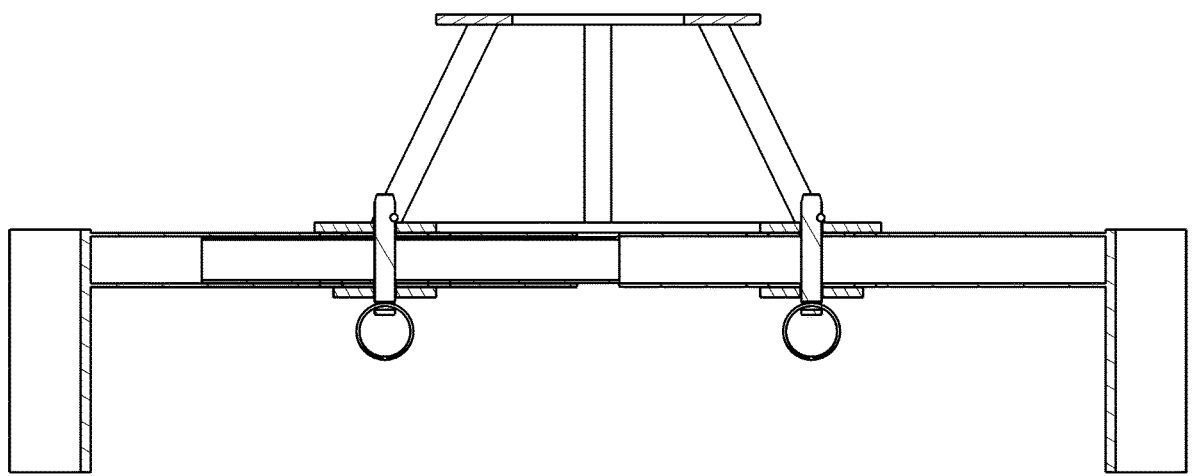
FIG. 4 is a cross-section view of the apparatus of FIG. 3 at plane 4-4.
Figure 5:
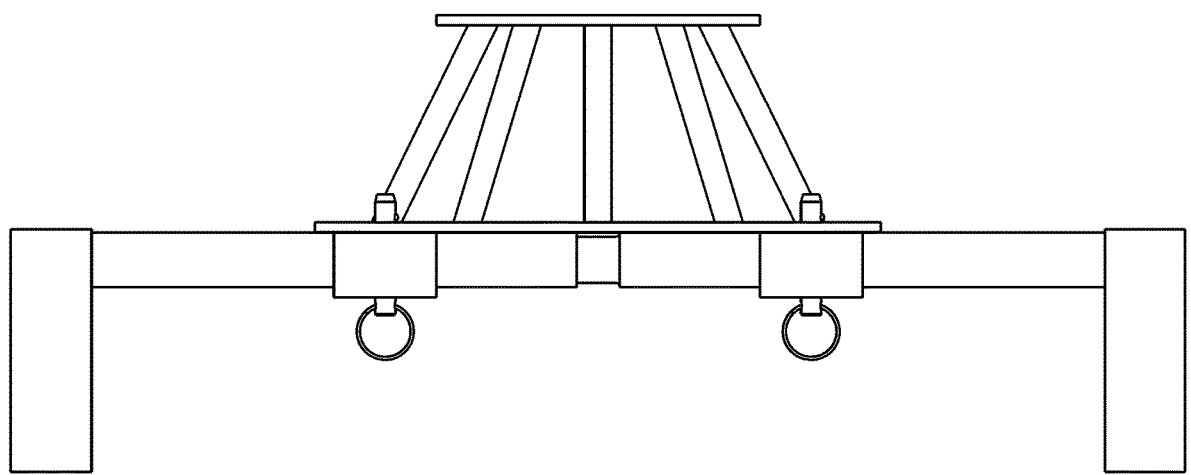
FIG. 5 is a top plan view of the apparatus of FIG. 2.
Figure 6:
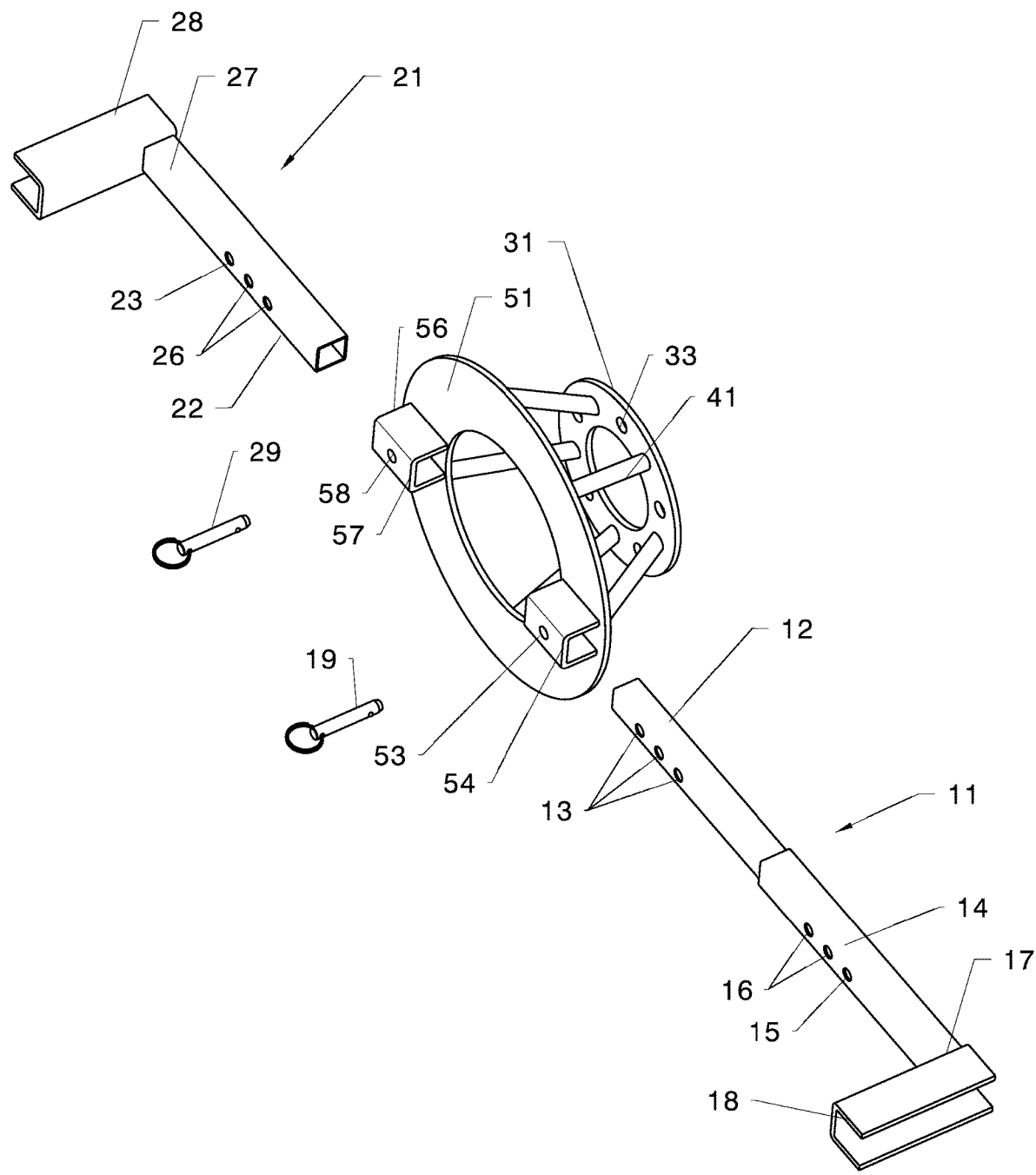
FIG. 6 is an exploded view of the apparatus of FIG. 2, depicting the separate parts of the hub assembly (hub plus fasteners) and the traction bar assembly (traction arm insert plus traction arm sleeve).
Figure 7:
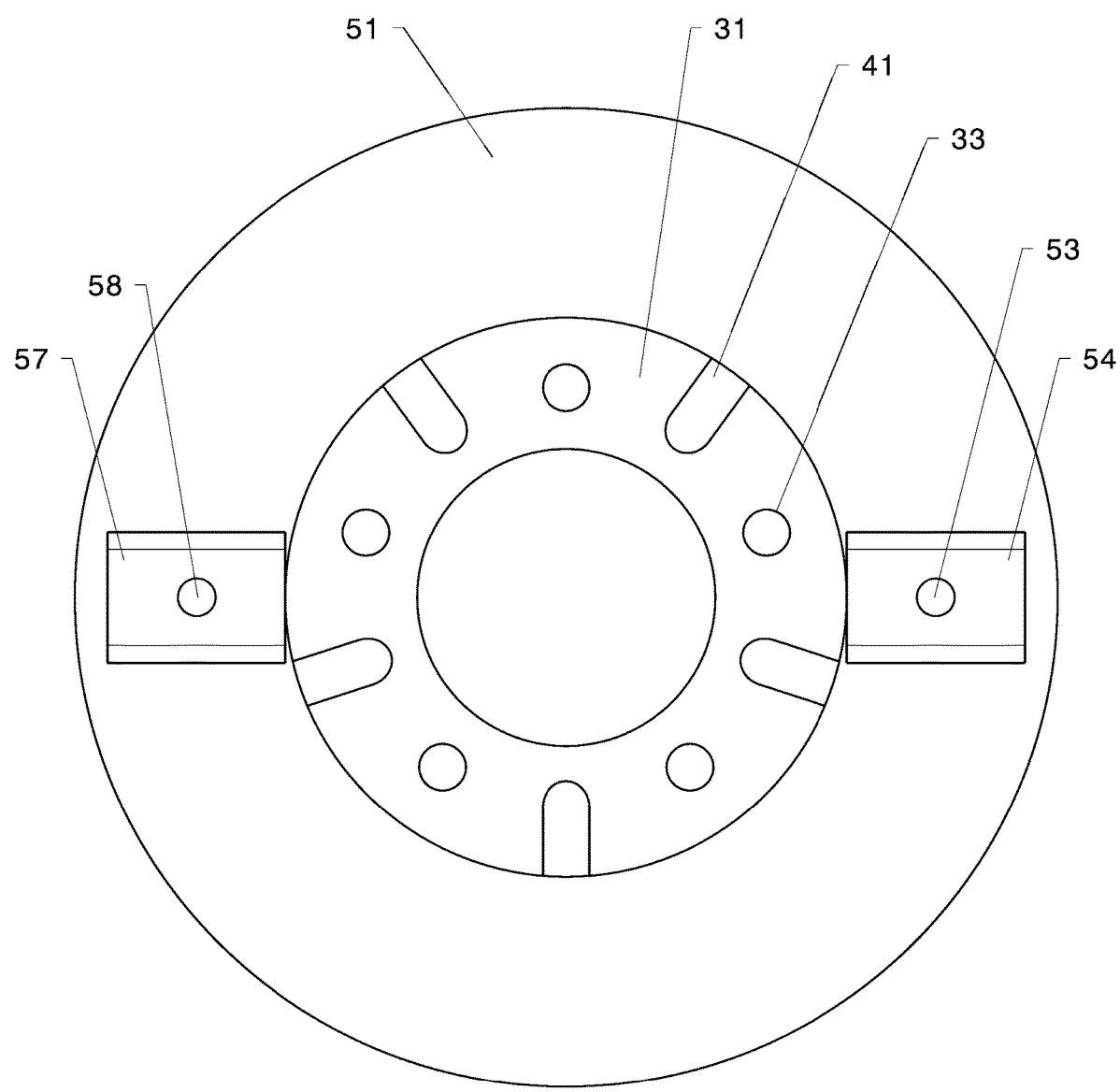
FIG. 7 is an exterior side elevation view of the hub of FIG. 2, axially rotated to the traction arms are horizontal.
Figure 8:
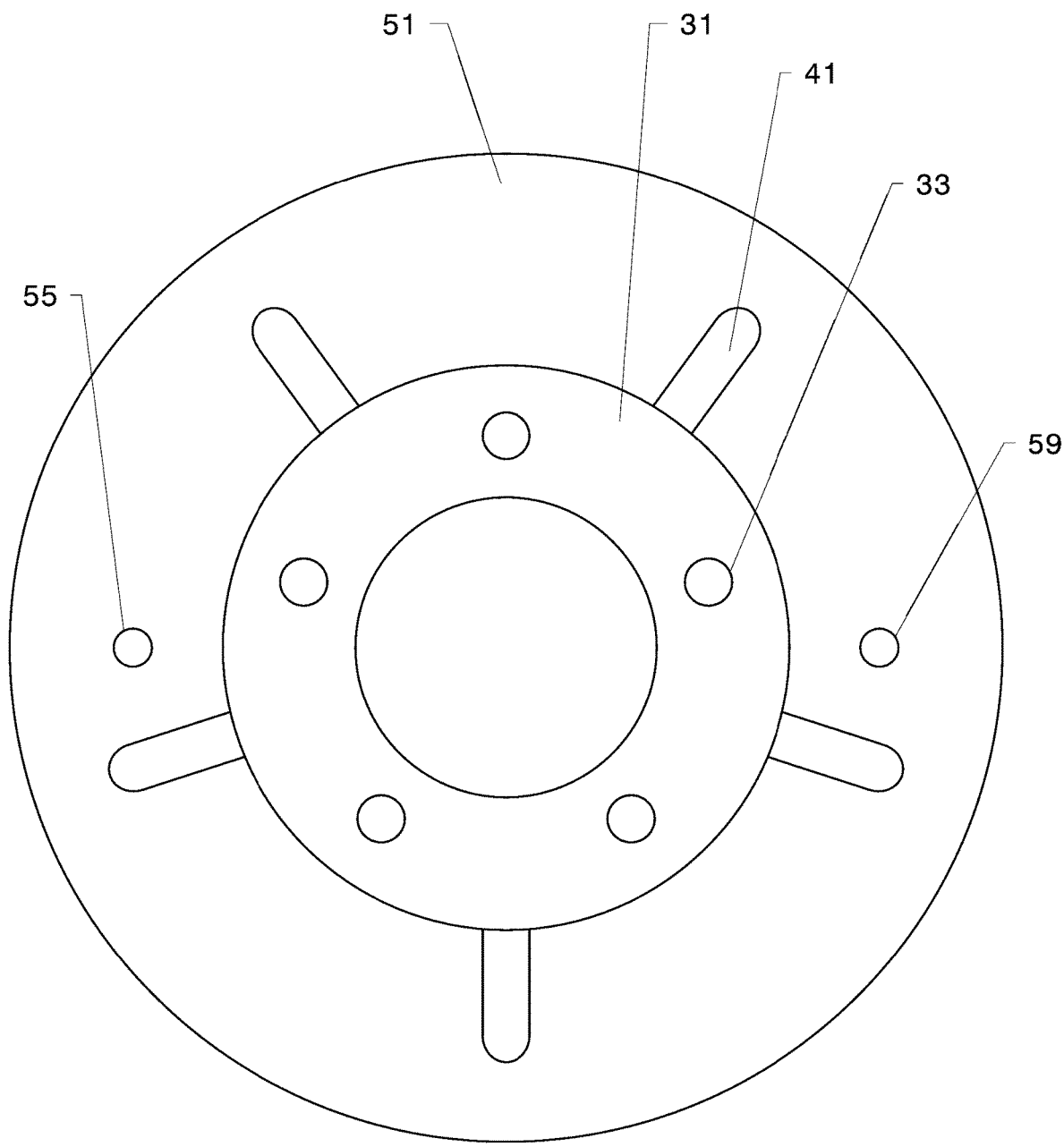
FIG. 8 is an interior side elevation view of the hub of FIG. 7.
Figure 9:
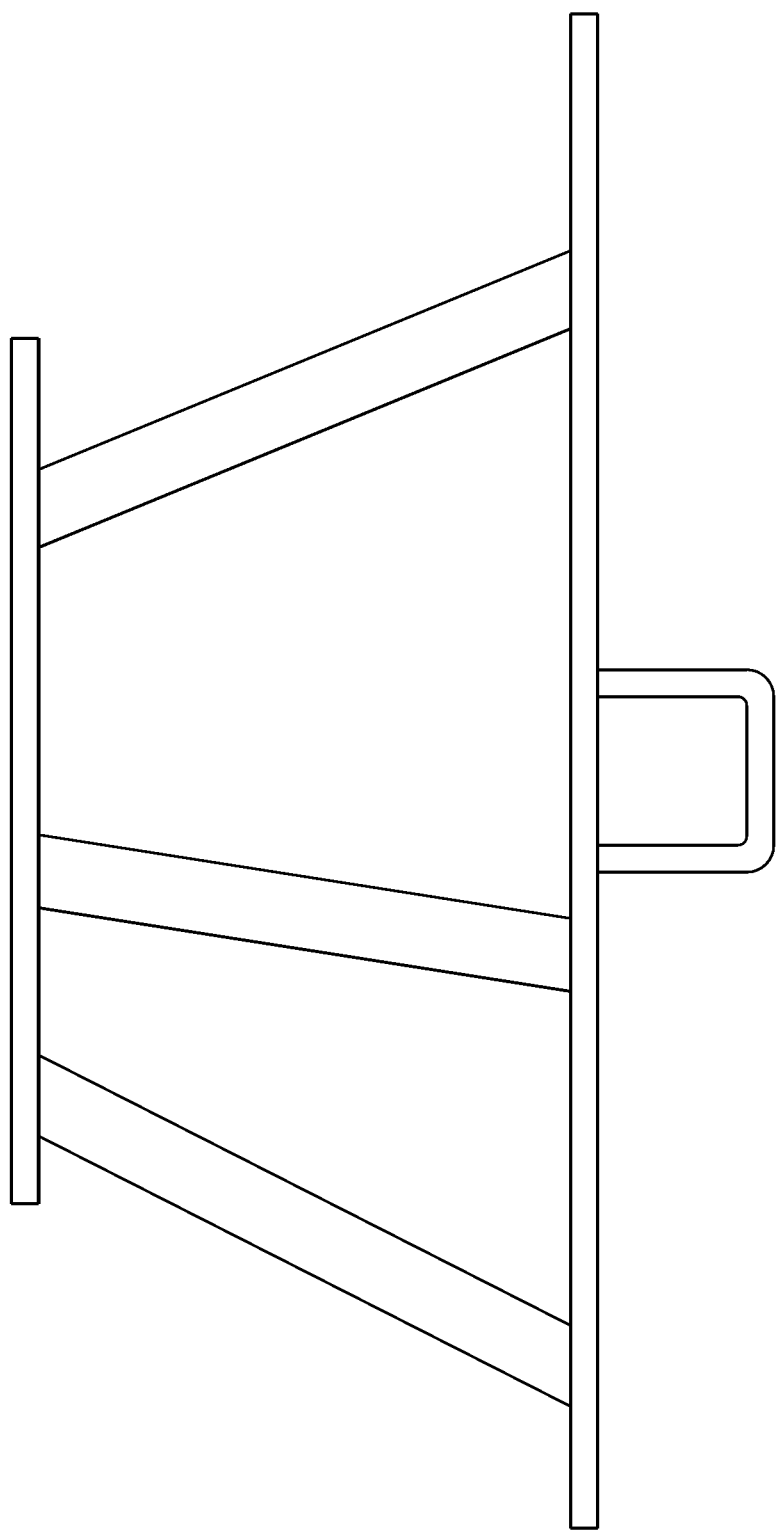
FIG. 9 is a front-side elevation view of the hub of FIG. 7.
Figure 10:
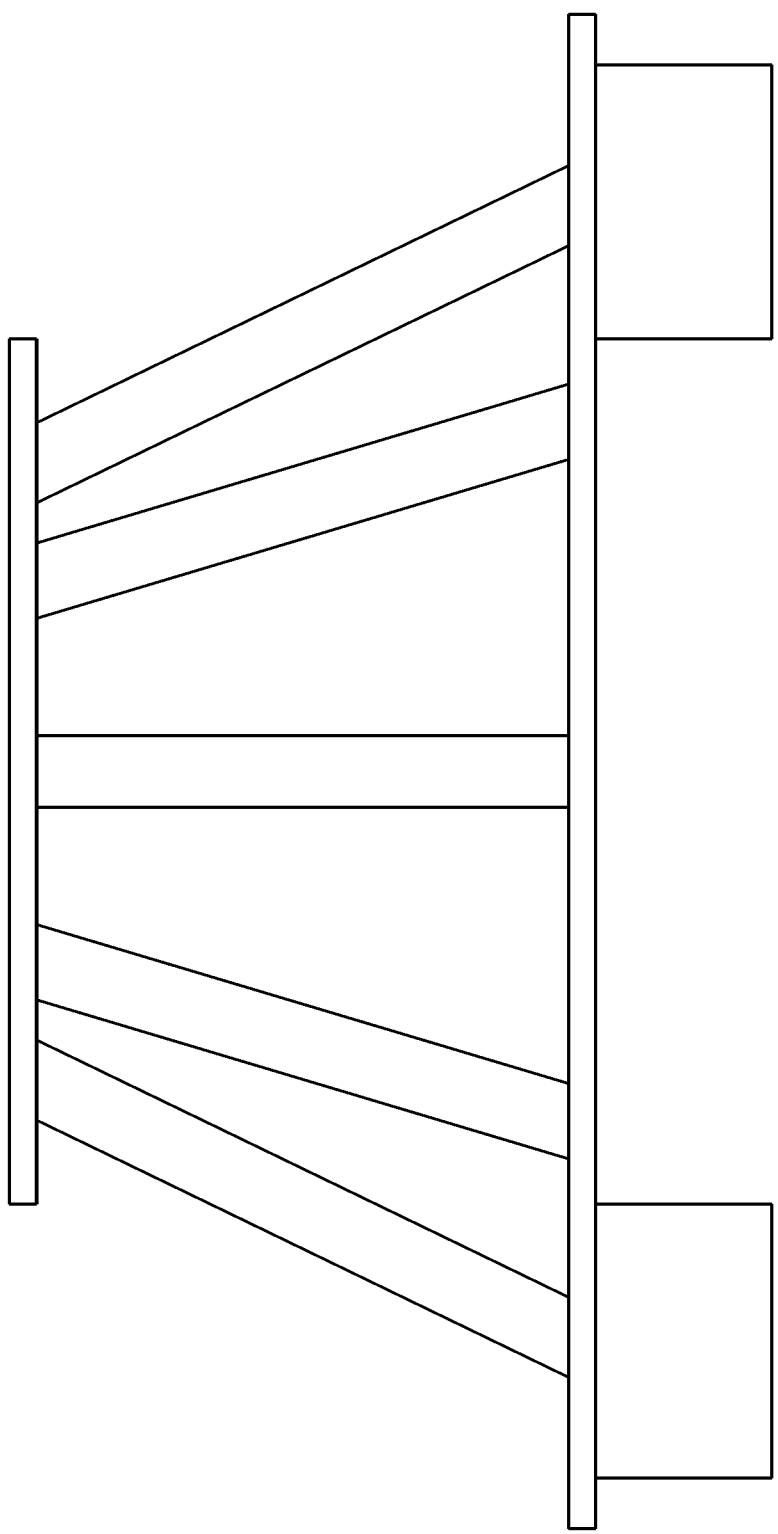
FIG. 10 is a front-side elevation view of the hub of FIG. 7, rotated 90 degrees on the hub axis.
Figure 11:
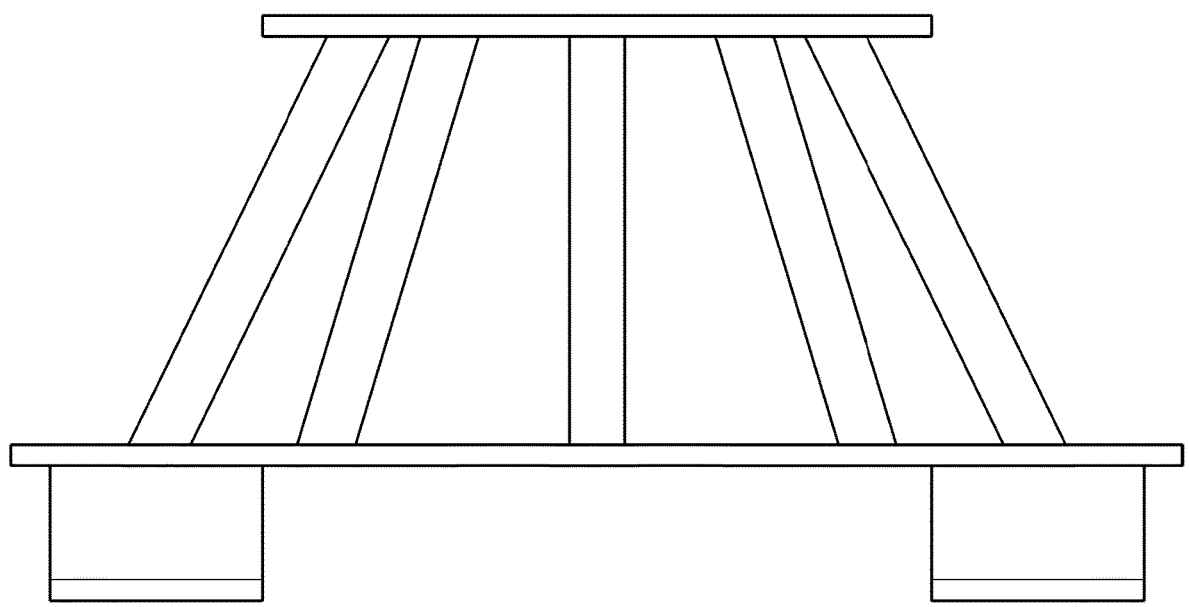
FIG. 11 is a top plan view of the hub of FIG. 7.
Figure 12:
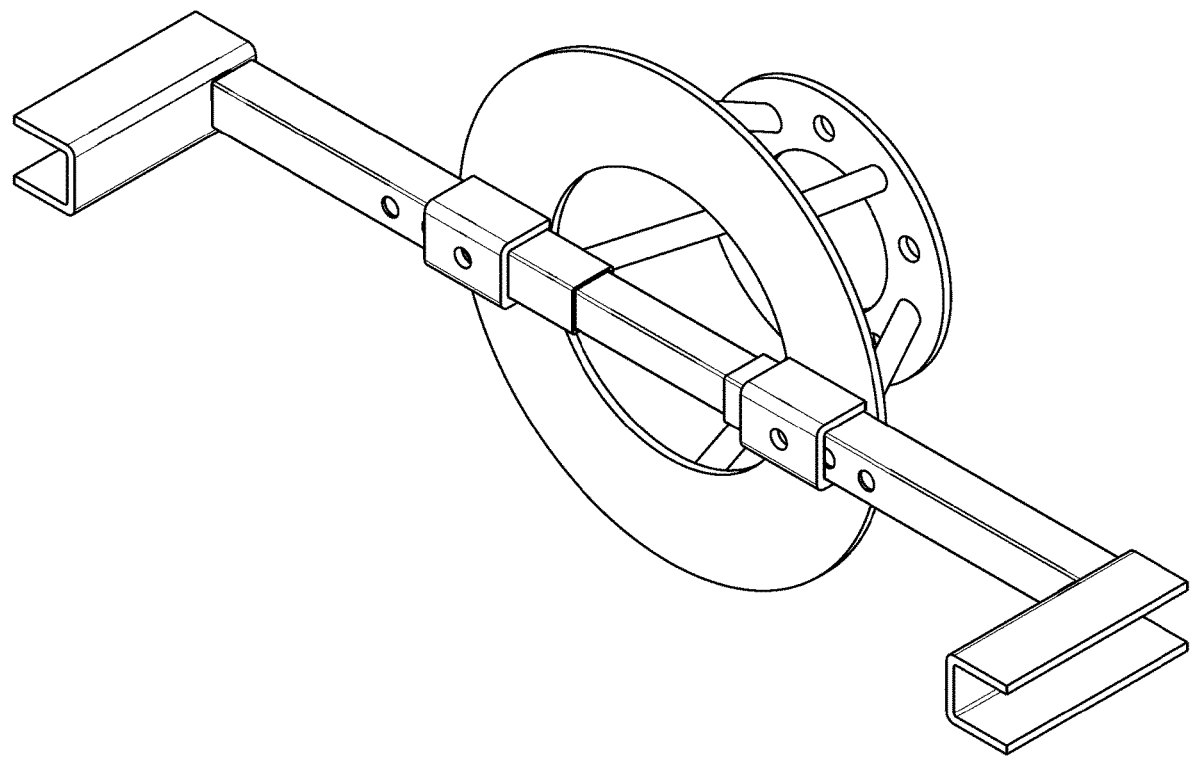
FIG. 12 is a perspective view of the hub of FIG. 7 with traction arms in a fully extended configuration.
Figure 13:
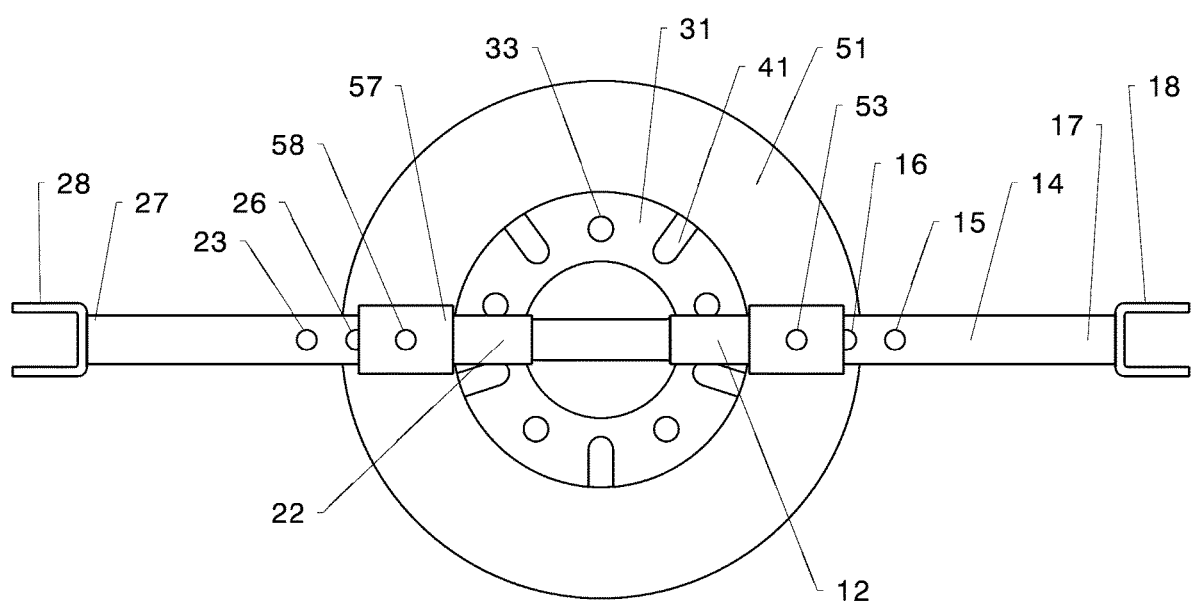
FIG. 13 is an exterior side elevation view of the hub and traction bar of FIG. 12.
Figure 14:
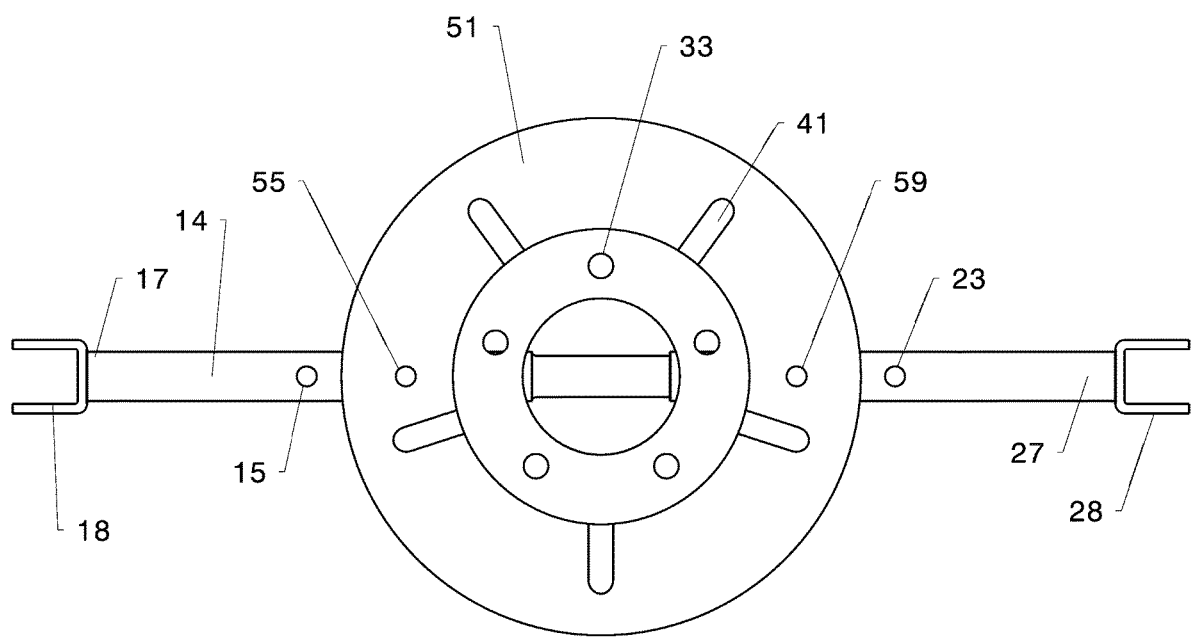
FIG. 14 is an interior side elevation view of the hub and traction bar of FIG. 12.
Figure 15:
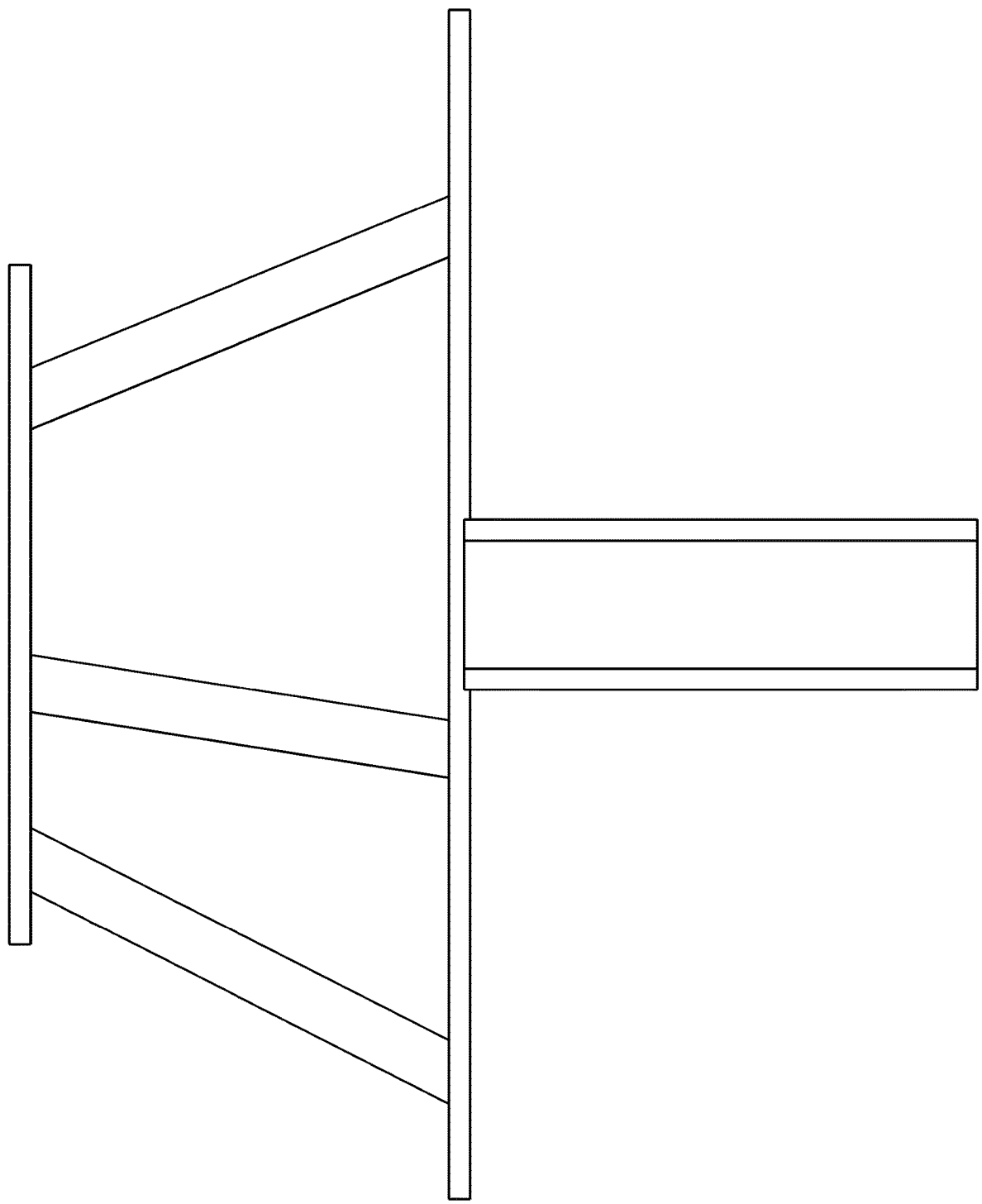
FIG. 15 is a front-side elevation view of the hub and traction bar of FIG. 12.
Figure 16:
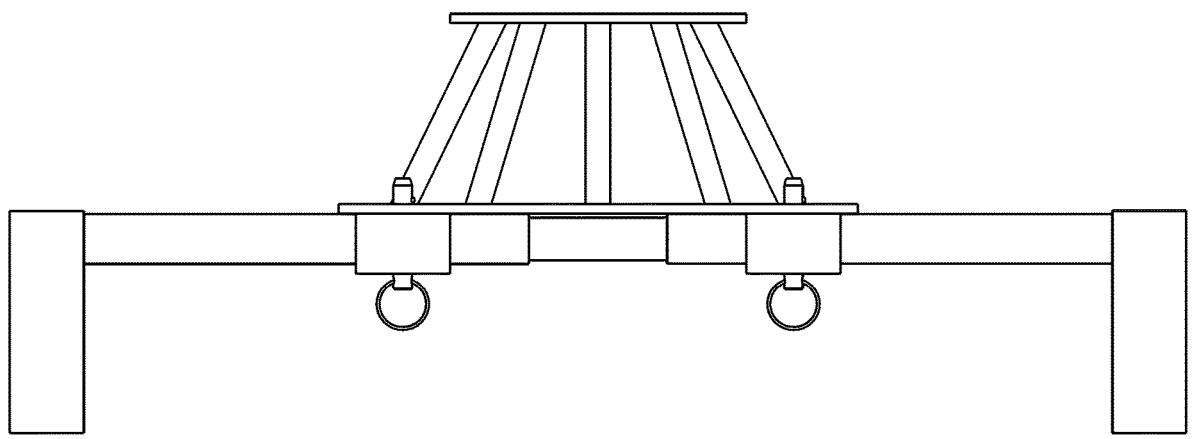
FIG. 16 is a top plan view of the hub and traction bar of FIG. 12, with pins inserted.
Figure 17:
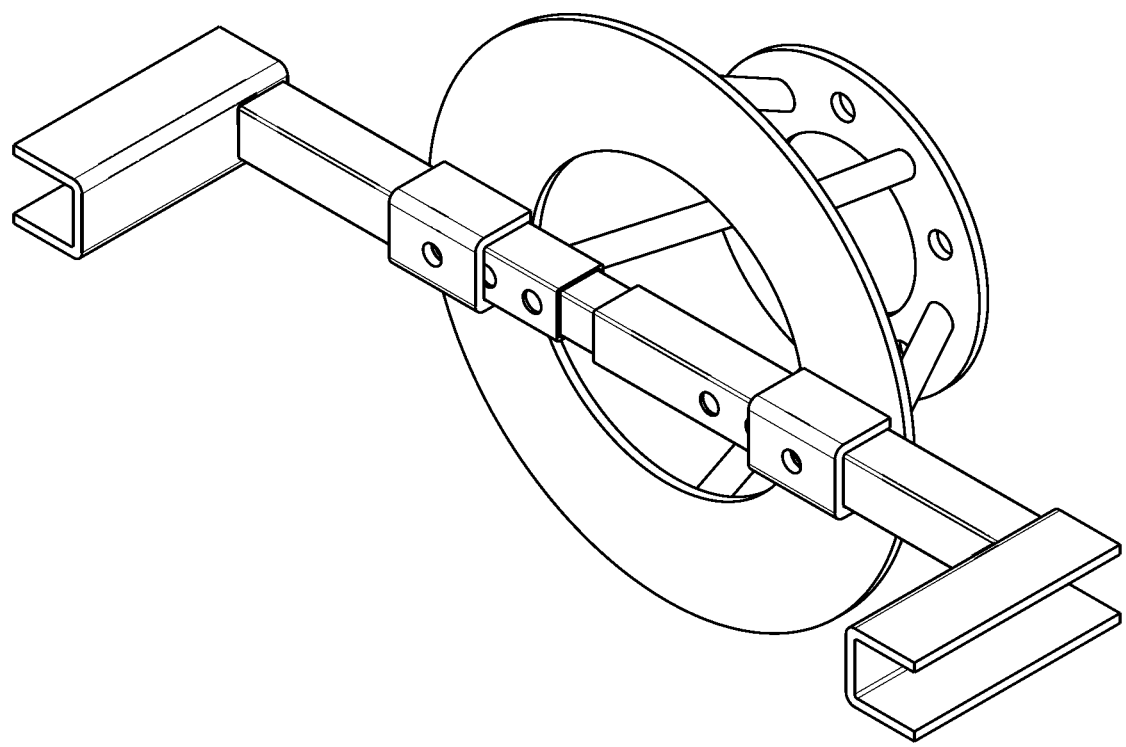
FIG. 17 is a perspective view of the hub and traction arms of FIG. 2 in a least extended configuration.
Figure 18:
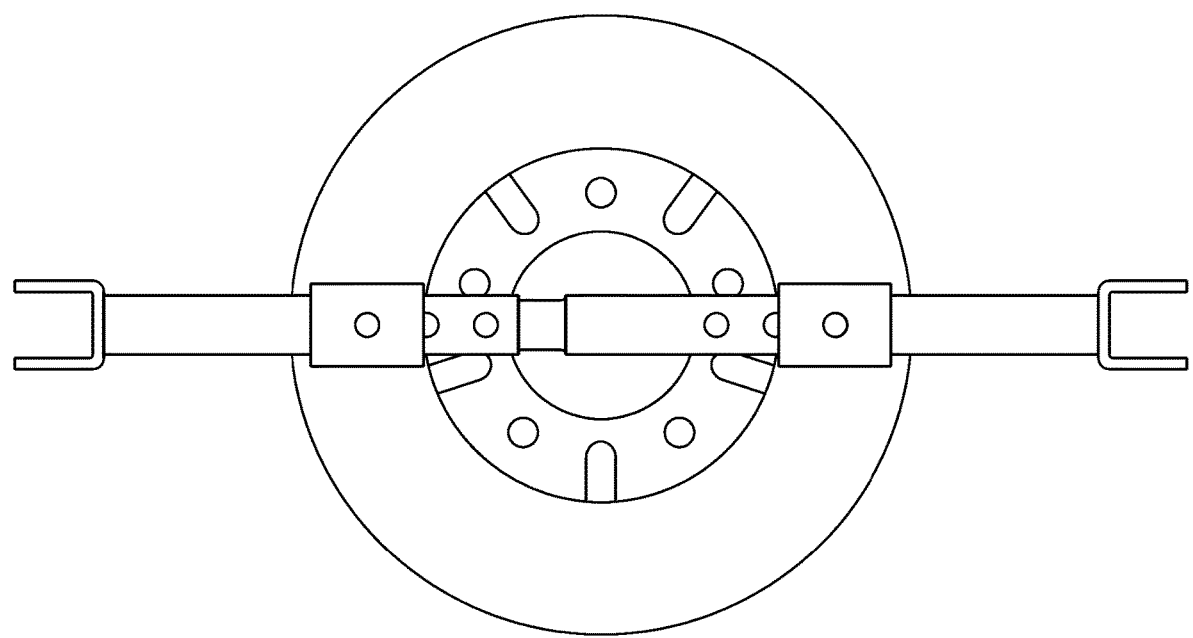
FIG. 18 is an exterior side elevation view of the hub and traction bar of FIG. 17.
Figure 19:
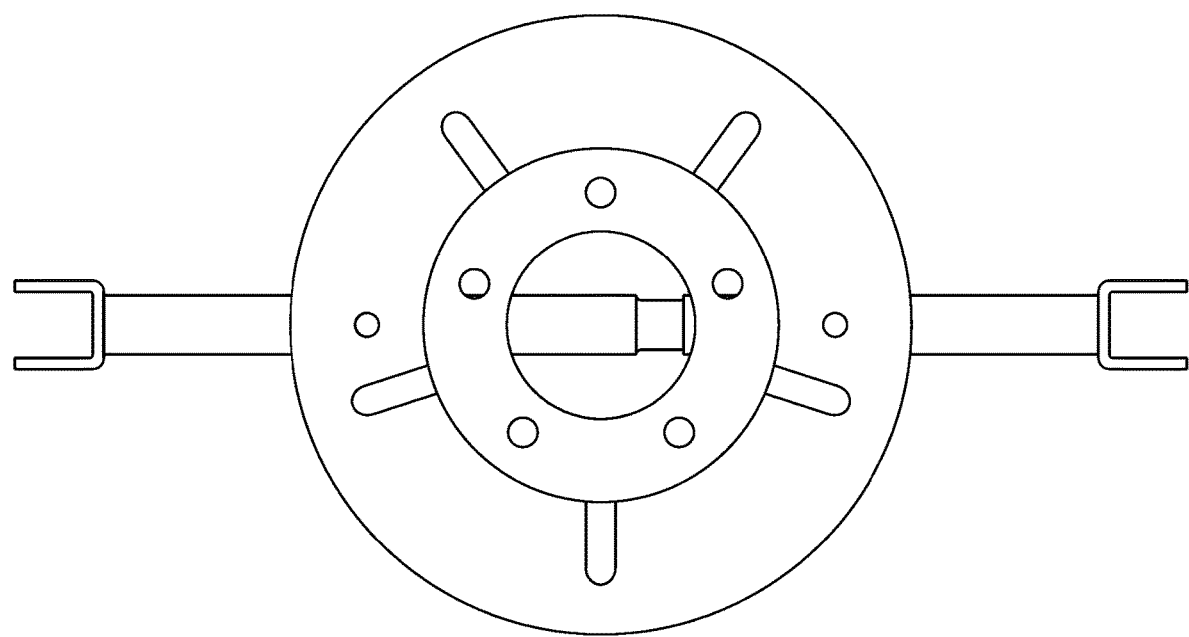
FIG. 19 is an interior side elevation view of the hub and traction bar of FIG. 17.
Figure 20:
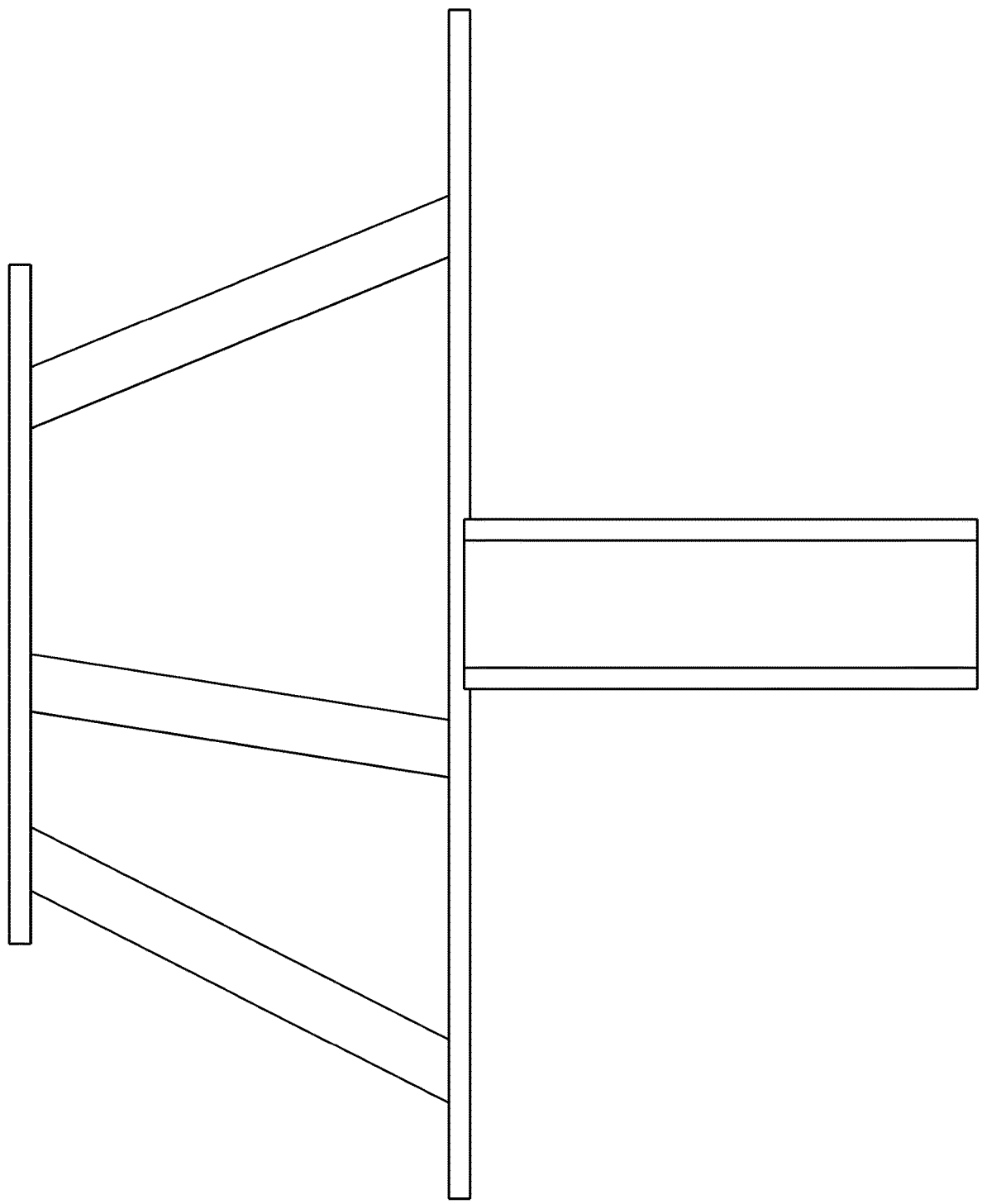
FIG. 20 is a front-side elevation view of the hub and traction bar of FIG. 17.
Figure 21:
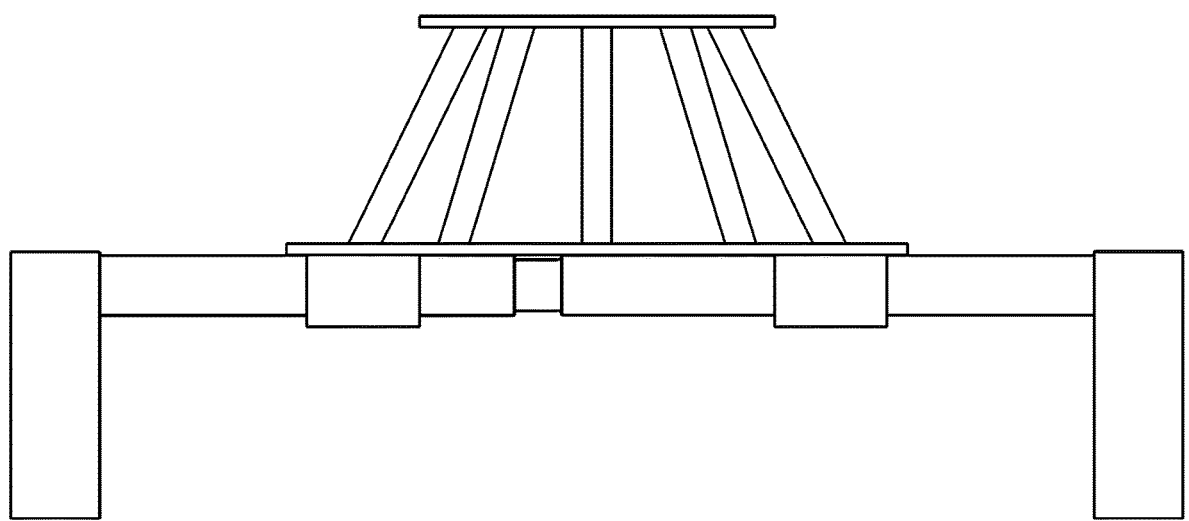
FIG. 21 is a top plan view of the hub and traction bar of FIG. 17.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The disclosure herein is not limited by construction materials to the extent that other materials satisfy the structural and/or functional requirements. For example, any material may be used so long as it satisfies the functional and structural requirements for which it is being used. In one embodiment, the apparatus or any part thereof may be constructed of steel or other structural rigid metallic material; however, any material may suffice as well, if it satisfies the functional and structural requirements for which it is being used. Likewise, the disclosed invention is not limited by any construction process or method.

The drawings depict one representative sample of a prototype made for use with a riding lawn mower. However, the same or a similar prototype can be made for use on an ATV or UTV, or other vehicle often driven off of pavement.

The drawings depict a prototype of the apparatus comprising a hub assembly, which carries a traction assembly including (comprising) an opposite pair of traction arms (11 and 21) that together form a traction bar; when in use, each end of the traction bar includes a traction foot (18 and 28) extending (or extendable) outside the circumference of the wheel to which the apparatus is affixed, to essentially dig into the soft terrain to provide additional traction to the wheel as it rotates. However, the invention disclosed herein is not limited to the particular embodiment depicted; it may include other embodiments performing the same functions in the same manner.

The hub assembly of the prototype includes a hub ring (31) (for anchoring the apparatus to the wheel), an outer ring (51) having at least two opposite exterior retainer brackets (52 and 56) (for accepting each traction arm, and anchoring the traction bar to the hub assembly), and separator struts (41) separating the two rings in parallel planes a sufficient distance to provide clearance for the traction bar outside the well of the hub of the drive wheel to which the apparatus is mounted.

For example, lug-bolt holes (33) are drilled in the hub ring (a 6" round metal disc, 3/16" thick), aligned with the lug-bolt holes of the hub of the drive wheel. In this embodiment for a drive wheel having five periodically spaced lug-bolt holes for attachment of the wheel to the drive axle, five aligned lug-bolt holes are drilled through the hub ring. The outer ring (51) is a 10¼" diameter round metal ring (3/16" thick), having an inner circumferential edge defining a round portal having an approximately 6" diameter in the center of the ring. Five spacer bars (¼" diameter cylindrical struts, 4¼" long) are welded between both the hub ring and the outer ring, to provide parallel-plane spacing between the rings.

Ideally, the portal is sufficient to permit good access to the lug bolts and lug-bolt holes, for installing the apparatus, and also for joining and securing the traction arms to form the traction bar having the desired length. In this embodiment, the rings are spaced about 4⅛" apart. Since the spacer bars (41) are each 4¼" long, they are not exactly perpendicular to the opposing faces of the disks; since the hub ring (31) typically has a smaller diameter than the outer ring, each spacer bar typically radiates angularly outward from the outer face of the hub ring to the inner face of the outer ring. Preferably, each respective end of each spacer bar is welded to the hub ring at a place approximately midway between two lug-bolt holes.

Each retainer bracket (52 and 56) may be a metal strip about 2" wide and 3" long (3/16" thick), which has been put in a press and bent into a C cross-section shape, such as a C-channel; each of the three faces of the C-channel bracket measures about 1", although other dimensions may be acceptable. Each is welded to the outer face of the outer ring, 180 degrees apart and with their C-channels aligned for acceptance of opposing traction arms. A ⅜" bore (53 and 58) is drilled through the outermost face (54 and 57) of each bracket and through the outer ring, aligned for acceptance of a retaining pin (19 and 19) extending through the bracket, traction arm(s) and outer ring.

The traction bar is formed by the inner end (12) of one traction arm (11) being inserted telescopically into the inner end (22) of another traction arm (21), while each arm is within a respective retainer bracket (52 and 56). The traction arm end accepting insertion of the other traction arm end may have larger lumen dimensions than the main length of the other traction arm; for example, a portion of a sleeve having a larger lumen may be welded to the exterior end region of the traction bar, so that the remaining portion of the sleeve may accept the insertion end of the other traction arm, which has the same sized lumen. Alternatively, the insertion end may have smaller lumen dimensions than the remainder of that traction arm, so that it may be inserted into the lumen of the receiving traction arm having the same lumen dimensions as the other. In this particular embodiment, a 1" square tubing (12 gauge) is cut into two pieces 8⅞" long. One end of a 12" long piece of ¾" square tubing (11 gauge) is inserted three inches into one of the pieces of 1" square tubing, and welded together. This will become the insertion traction arm; the other piece of 1" square tubing, without the telescopically inserted ¾" square tubing, will become the receiving traction arm.

For both traction arms, one ⅜" bore is drilled transversely through the 1" tubing, about 4.937" from what will become the inner end; a second ⅜" bore is drilled transversely through the 1" tubing, about 6.280" from what will become the inner end; and a third ⅜" bore is drilled transversely through the 1" tubing, about 7.623" from what will become the inner end.

In one embodiment, each traction foot includes a C-channel (18 and 28) with the open side interfacing with the ground. For example, the C-channel may measure approximately 3/16" thick, with a 1" wall supporting walls outstanding about two inches each. In another embodiment, the traction foot at the outer end of each traction arm is a closed, club-like member. For this latter embodiment, each foot is essentially a 4¼" long section of 1¼" square tubing (10 gauge). Its open ends may or may not be capped. It may be welded perpendicularly to the outer end of a traction arm, essentially forming the top of a "T" if welded at its midpoint. Preferably, the weld connection will occur toward one end of the 4¼" long section of 1¼" square tubing, essentially forming the bottom of an "L"; this configuration will minimize the clearance necessary between the side wall of the drive wheel and the traction arms.

To install the apparatus on a vehicle such as a zero turn lawn mower, the mower must be elevated (jacked up) so that the lug bolts can be removed from the drive wheels. The apparatus can have a hub ring having at least as many lug-bolt holes as the hub, no matter how many. Each hub assembly is anchored to the respective drive wheel hub by alignment of the hub ring's lug-bolt holes over those of the drive wheel hub, then re-inserting and tightening the lug bolts. Each drive wheel can then be rotated to where the brackets allow insertion of each respective traction arm. Unless the vehicle is already situated in soft terrain and in need of immediate deployment of the apparatus, preferably the traction arms are installed in their least extended configuration, forming a traction bar having traction feet not yet extending beyond the circumference of the drive wheel. In this shortened configuration, the vehicle can travel without unnecessary contact between the traction bars and the ground, to avoid any unnecessary stress or wear-and-tear on the apparatus.

Next, the user installs the traction arms in the desired length. Preferably, the sleeve end of a receiving traction arm is inserted into and through a bracket, aligning one of the traction arm adjustment bores with the bore in the outer face of the bracket, and leaving the traction foot (a C-channel segment) extending towards or past the circumference of the drive wheel tread, in the desired length. Then, the use similarly installs the other traction arm in a second bracket, in the desired length, with both inner ends of the traction arms overlapping telescopically. A respective ⅜" cotter pin is then inserted through the respective bracket bore and through the aligned bores of the traction arms and through the aligned bore in the outer ring. Each pin can be secured with a cotter key through the transverse bore near the tip of the cotter pin; alternatively, the pin may include other known means of securing, such as the end having a spring loaded ball that prevents retraction of the cotter pin.

One general embodiment of the invention comprises (includes) an apparatus providing auxiliary traction to a drive wheel with a hub anchored to a drive axle and carrying a wheel having an outer circumference including a tire. The apparatus may include at least one traction bar anchored to a mounting means for mounting the traction bar to the hub of the drive wheel. The traction bar may include an opposite pair of traction ends each extending beyond said outer circumference.

The mounting means may include a hub ring adjacent the hub, and include a plurality of lug-bolt holes aligned with the lug-bolt holes of the hub, for accepting lug bolts mounting the hub assembly to the hub. The mounting means further may include an outer ring oriented on a plane parallel to and co-axial with the hub ring and the hub. The outer ring may include an anchoring means for anchoring the traction bar to the outer ring.

The traction bar further may include a first traction arm which may include a first traction end and an opposite first interior end; and a second traction arm may include a second traction end and an opposite second interior end. The anchoring means may include a first anchoring means anchoring the first traction arm to the outer ring, and it may include a second anchoring means anchoring the second traction arm to the outer ring. The anchoring means may further include a fastening means for fastening the interior ends of the traction arms to form the traction bar. The first interior end may overlap the second interior end. The second interior end may include a sleeve; and the overlapping of the first interior end and the second interior end may include the first interior end being telescopically received within the sleeve.

The first interior end of the first traction arm may include at least one transverse bore therethrough, and the sleeve of the second traction arm may likewise include at least one transverse bore therethrough. The first anchoring means for anchoring the first traction arm to the outer ring may include at least one transverse bore through an intermediate portion of the first traction arm, for anchoring the first traction arm having its traction foot extending a desired distance towards or past the circumference of the drive wheel. The first anchoring means may include a first bracket on the outer ring, accepting insertion of the first interior end, and have a first face defining a first bore aligned with the bore of the first intermediate portion; it may further include the outer ring having a first bore aligned with the bore of the first intermediate portion for accepting a first retainer pin extending through the aligned bores through the first bracket and first intermediate portion and outer ring. Similarly, the second anchoring means for anchoring the second traction arm to the outer ring may include a second bracket accepting insertion of the sleeve, and it may have a second outer face defining a second bore aligned with the bore of the sleeve. The second anchoring means may further include the outer ring having a second bore aligned with the bore of the sleeve for accepting a second retainer pin extending through the aligned bores through the second bracket and sleeve and first inner end of the first traction arm and outer ring.

The auxiliary traction apparatus further may include a length-setting means for setting the length of overlap between the first interior end and the second interior end; this will essentially determine whether one or both traction feet extend beyond the circumference of the drive wheels, and the amount of such extension. The length-setting means may include a plurality of additional aligned bores spaced longitudinally along and extending transversely through the overlapping sleeve and the first interior end received therein. The intermediate portion of the first traction arm should also have a set of transverse bores allowing the first traction arm to be anchored to the hub assembly (by the first bracket) so that the extension of its traction foot towards or beyond the circumference of the drive wheel will be the same as the extension of the second traction foot. The aligned bores will receive and retain a pin preventing further telescopic movement.

At least one of the traction ends may include a plurality of separate traction surfaces interfacing with the ground. The plurality of separate traction surfaces may include a substantially parallel pair of separate outstanding edges oriented perpendicularly to the longitudinal axis of the traction bar. For example, a C-channel with the open portion in contact with the ground.

One more specific embodiment of the apparatus providing auxiliary traction to a drive wheel with a hub anchored to a drive axle comprises a traction bar which may include a plurality of traction ends (17 and 27) equally spaced beyond the outer circumference of the wheel, the traction bar anchored to a mounting means for mounting the traction bar to the hub of the drive wheel The traction bar may include a first traction arm (11) having a first traction end (17) and an opposite first interior end (12), and an intermediate portion (14) therebetween. It may also include a second traction arm (21) having a second traction end (27) and an opposite sleeve end (22) accepting the first interior end (12) received telescopically therein.

The mounting means may include a hub assembly comprising:

(1) a hub ring (31) adjacent the hub and defining a plurality of lug-bolt holes (33) aligned with the lug-bolt holes of the hub, and accepting lug bolts mounting the hub assembly to the hub;

(2) an outer ring (51) oriented on a plane parallel to and co-axial with the hub ring and the hub, the outer ring comprising a first anchoring means for anchoring the first traction arm to the outer ring, and includes a second anchoring means for anchoring the second traction arm to the outer ring opposite the first anchoring ring; and (3) a plurality of spacer struts (41) separating the rings.

The intermediate portion (14) of the first traction arm may define a first intermediate bore (15) extending transversely therethrough. The sleeve end (22) of the second traction arm may define a second sleeve end bore (23) extending transversely therethrough.

The first anchoring means for anchoring the first traction arm to the outer ring may include a first outer ring bracket (52) affixed to the outer ring and accepting insertion of the first interior end (12); it may also have a first face (54) defining a first bracket bore (53). The first anchoring means may further include the outer ring defining a first outer ring bore (55) aligned with the first bracket bore 53), wherein alignment of the first intermediate bore (15) between the aligned first bracket bore and first outer ring bore enables insertion of a first retainer pin (19) extending through said aligned bores through the first face and intermediate portion and outer ring.

The second anchoring means for anchoring the second traction arm to the outer ring may include a second outer ring bracket (56) opposite the first bracket and accepting insertion of the sleeve end (22). It may also have a second face (57) defining a second bracket bore (58). The second anchoring means may further include the outer ring defining a second outer ring bore 59) aligned with the second bracket bore (58), wherein alignment of the second sleeve end bore 23) between the aligned second bracket bore and second outer ring bore enables insertion of a second retainer pin extending through said aligned bores through the second face and sleeve end and outer ring.

At least one of the traction ends may include a plurality of separate traction surfaces interfacing with the ground. The plurality of separate traction surfaces may include a substantially parallel pair of separate outstanding edges oriented perpendicularly to the longitudinal axis of the traction bar.

Besides the apparatus and systems disclosed herein, the invention includes a method of deploying the apparatus, including the steps set forth hereinabove.

Other utility and advantages will be apparent to somebody of ordinary skill in the field, upon a review of this application.

I claim:

1. An apparatus providing auxiliary traction to a drive wheel with a hub anchored to a drive axle and carrying a wheel having an outer circumference including a tire, wherein the apparatus comprises at least one traction bar anchored to a mounting means for mounting the traction bar to the hub of the drive wheel, the traction bar comprising an opposite pair of traction ends each extending beyond the outer circumference, each traction end including a proximal portion connecting to said traction bar and a distal portion extending in an axial direction away from the outer plane of the tire wherein the mounting means comprises a hub ring adjacent the hub and defines a plurality of lug-bolt holes aligned with the lug-bolt holes of the hub, and accepting lug bolts mounting the hub assembly to the hub;

wherein the mounting means further comprises an outer ring oriented on a plane parallel to and co-axial with the hub ring and the hub, the outer ring comprises an anchoring means for anchoring the traction bar to the outer ring;

wherein the traction bar further comprises a first traction arm comprising a first traction end and an opposite first interior end and an intermediate portion therebetween, and a second traction arm comprising a second traction end and an opposite second interior end, the anchoring means comprises a first anchoring means anchoring the first traction arm to the outer ring and comprises a second anchoring means anchoring the second traction arm to the outer ring opposite said first anchoring means, and further comprises a fastening means for fastening the interior ends of the traction arms to form the traction bar;

the first interior end overlapping the second interior end; and wherein the second interior end comprises a sleeve, the overlapping of the first interior end and the second interior end comprising the first interior end telescopically received within the sleeve—for clarity.

2. The auxiliary traction apparatus of claim 1, wherein:

(a) the intermediate portion of the first traction arm defines a first intermediate bore extending transversely therethrough, and the sleeve end of the second traction arm defines a second sleeve end bore extending transversely therethrough; and (b) the first anchoring means for anchoring the first traction arm to the outer ring comprises a first outer ring bracket affixed to the outer ring and accepting insertion of the first interior end and having a first face defining a first bracket bore, and further comprises the outer ring defining a first outer ring bore aligned with the first bracket bore, wherein alignment of the first intermediate bore between the aligned first bracket bore and first outer ring bore enables insertion of a first retainer pin extending through said aligned bores through the first face and intermediate portion and outer ring; and (c) the second anchoring means for anchoring the second traction arm to the outer ring comprises a second outer ring bracket opposite the first bracket and accepting insertion of the sleeve end and having a second face defining a second bracket bore, and further comprising the outer ring defining a second outer ring bore aligned with the second bracket bore, wherein alignment of the second sleeve end bore between the aligned second bracket bore and second outer ring bore enables insertion of a second retainer pin extending through said aligned bores through the second face and sleeve end and outer ring.

3. The auxiliary traction apparatus of claim 2, further comprising a length-setting means for setting the amount of extension of each traction end towards or beyond the circumference of the drive wheel.

4. The auxiliary traction apparatus of claim 3, wherein the length-setting means comprises:

(a) the sleeve end of the second traction arm further defining a plurality of additional bores spaced beside the second sleeve end bore;

(b) the first interior end of the first traction arm defining a plurality of bores alignable with the bores of the sleeve end following telescopic insertion therein, wherein when the first interior end is telescopically received within the sleeve end, one of said bores of the first interior end aligns with one of said bores of the sleeve end and aligns with the second outer ring bore and the second bracket bore to enable acceptance of the second retainer pin extending through said aligned bores to set the length of the second traction arm; and (c) the intermediate portion of the first traction arm further defining a plurality of additional bores spaced beside the first intermediate bore, wherein when the first interior end is telescopically received within the sleeve end, one of said bores of the intermediate portion aligns with the first bracket bore and aligns with the first outer ring bore to enable acceptance of the first retainer pin extending through said aligned bores to set the length of the first traction arm.

5. The auxiliary traction apparatus of claim 4, wherein a least one of the traction ends comprises a plurality of separate traction surfaces for interfacing with the ground.

6. The auxiliary traction apparatus of claim 5, the plurality of separate traction surfaces comprising a substantially parallel pair of separate outstanding edges oriented perpendicularly to the longitudinal axis of the traction bar.

7. An apparatus providing auxiliary traction to a drive wheel with a hub anchored to a drive axle and carrying the drive wheel having an outer circumference including a tire, wherein the apparatus comprises a traction bar comprising a plurality of traction ends extendable beyond the outer circumference of the drive wheel, the traction bar anchored to a mounting means for mounting the traction bar to the hub of the drive wheel, wherein:

(a) the traction bar comprises a first traction arm comprising a first traction end and an opposite first interior end and an intermediate portion therebetween, and a second traction arm comprising a second traction end and an opposite sleeve end accepting the first interior end received telescopically therein;

(b) the mounting means comprises a hub assembly comprising:

(1) a hub ring adjacent the hub and defining a plurality of lug-bolt holes aligned with the lug-bolt holes of the hub, and accepting lug bolts mounting the hub assembly to the hub;

(2) an outer ring oriented on a plane parallel to and co-axial with the hub ring and the hub, the outer ring comprising a first anchoring means for anchoring the first traction arm to the outer ring, and includes a second anchoring means for anchoring the second traction arm to the outer ring opposite the first anchoring ring; and (3) a plurality of spacer struts separating the rings.

8. The auxiliary traction apparatus of claim 7, wherein:

(a) the intermediate portion of the first traction arm defines a first intermediate bore extending transversely therethrough, and the sleeve end of the second traction arm defines a second sleeve end bore extending transversely therethrough; and (b) the first anchoring means for anchoring the first traction arm to the outer ring comprises a first outer ring bracket affixed to the outer ring and accepting insertion of the first interior end and having a first face defining a first bracket bore, and further comprises the outer ring defining a first outer ring bore aligned with the first bracket bore, wherein alignment of the first intermediate bore between the aligned first bracket bore and first outer ring bore enables insertion of a first retainer pin extending through said aligned bores through the first face and intermediate portion and outer ring; and (c) the second anchoring means for anchoring the second traction arm to the outer ring comprises a second outer ring bracket opposite the first bracket and accepting insertion of the sleeve end and having a second face defining a second bracket bore, and further comprising the outer ring defining a second outer ring bore aligned with the second bracket bore, wherein alignment of the second sleeve end bore between the aligned second bracket bore and second outer ring bore enables insertion of a second retainer pin extending through said aligned bores through the second face and sleeve end and outer ring.

9. The auxiliary traction apparatus of claim 8, further comprising a length-setting means for setting the amount of extension of the traction ends toward or beyond the circumference of the drive wheel, wherein:

(a) the sleeve end of the second traction arm further defines a plurality of additional bores spaced beside the second sleeve end bore; and (b) the first interior end of the first traction arm defines a plurality of bores alignable with the bores of the sleeve end following telescopic insertion therein, wherein when the first interior end is telescopically received within the sleeve end, one of said bores of the first interior end aligns with one of said bores of the sleeve end and aligns with the second outer ring bore and the second bracket bore to enable acceptance of the second retainer pin extending through said aligned bores to set the length of the second traction arm; and (c) the intermediate portion of the first traction arm further defines a plurality of additional bores spaced beside the first intermediate bore, wherein when the first interior end is telescopically received within the sleeve end, one of said bores of the intermediate portion aligns with the first bracket bore and aligns with the first outer ring bore to enable acceptance of the first retainer pin extending through said aligned bores to set the length of the first traction arm.

10. The auxiliary traction apparatus of claim 9, wherein a least one of the traction ends comprises a plurality of separate traction surfaces interfacing with the ground.

11. The auxiliary traction apparatus of claim 10, the plurality of separate traction surfaces comprises a substantially parallel pair of separate outstanding edges oriented perpendicularly to the longitudinal axis of the traction bar.

\* \* \* \* \*